(12) United States Patent
Balazinski et al.

(10) Patent No.: US 6,738,379 B1
(45) Date of Patent: May 18, 2004

(54) METHOD OF PRESERVING DATA PACKET SEQUENCING

(75) Inventors: Bartosz Balazinski, Montreal (CA); Yves Racine, Verdun (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/538,195

(22) Filed: Mar. 30, 2000

(51) Int. Cl.[7] .......................... H04L 12/28; H04L 12/56
(52) U.S. Cl. ...................... 370/394; 370/413; 370/474
(58) Field of Search .................. 370/338, 352, 370/353, 354, 394, 395.52, 413, 417, 473, 474, 476, 356, 386, 388, 392, 412, 422, 429

(56) References Cited

U.S. PATENT DOCUMENTS 6,445,717 B1 * 9/2002 Gibson et al. ............... 370/473
6,590,885 B1 * 7/2003 Jorgensen .................... 370/338

* cited by examiner

Primary Examiner—Phirin Sam
(74) Attorney, Agent, or Firm—Smith & Danamraj, PC (57) ABSTRACT

A method of preserving data packet sequencing between nodes in a radio telecommunications network in which the User Datagram Protocol/Internet Protocol (UDP/IP) is utilized to communicate between the nodes of the network. Sequencing numbers are added to the headers of a plurality of data packets which are transmitted over a plurality of data transmission paths. The UDP/IP protocol is adapted with a resequencing layer which is utilized at the receiving node to resequence the packets.

5 Claims, 5 Drawing Sheets

METHOD OF PRESERVING DATA PACKET SEQUENCING

BACKGROUND OF THE INVENTION

1. Technical Field of the Invention

This invention relates to radio telecommunications systems, and more particularly, to a method of preserving data packet sequencing in a radio telecommunications network in which an Internet Protocol (IP) based protocol is utilized to communicate data between the nodes of the network.

2. Description of Related Art

Existing radio telecommunications networks utilize a frame relay (FR) protocol which selects a single FR virtual circuit for communication between an originating node and a destination node. A sequence of data packets is then sent on the single FR virtual circuit to the destination node. Consequently, the data packets arrive in the same order as they are sent. However, there are disadvantages to the FR protocol. First, FR does not retransmit faulty or missing data packets. Thus, if a packet is dropped during transmission, it is lost with no chance of recovery. Second, if the FR virtual circuit is bad, the entire transmission is lost. Therefore, it would be advantageous to have a protocol that overcomes the disadvantages of FR.

Existing IP-based data networks utilize the Transmission Control Protocol (TCP) or the User Datagram Protocol (UDP) to transmit data between nodes. Both of these protocols operate over an IP layer that solves the problem of a link going down by automatically re-routing packets over alternative routes. The TCP protocol, however, is a connection-oriented acknowledgment protocol that is much too powerful and robust to use as a replacement for FR in radio telecommunications networks. In addition, TCP has a very aggressive retransmission scheme that is not suitable for applications such as real-time voice transmission. The UDP protocol is not as "heavy" as the TCP protocol, and it does not retransmit lost packets, but UDP is not suitable as a replacement for FR because it does not enforce packet sequencing. Therefore, neither TCP nor UDP are suitable replacements for FR.

It would be advantageous to have a method of preserving data packet sequencing between the nodes in a radio telecommunications network that overcomes the disadvantages of both TCP and UDP. The present invention provides such a method.

SUMMARY OF THE INVENTION

In essence, the present invention augments the UDP protocol to attain similar characteristics as FR. Since the UDP protocol does not enforce packet sequencing, the invention augments UDP by adding this capability. As a result, the invention provides a protocol with automatic routing behavior and packet resequencing without requiring any supplemental control data transmissions or acknowledgments.

Thus, in one aspect, the present invention is a method of preserving the sequence of a plurality of data packets in a radio telecommunications network in which an Internet Protocol (IP) based protocol is utilized between a sending node and a receiving node whereby data packets at the receiving node are resequenced in the same order as sent by the sending node. The method includes the steps of sequentially numbering the data packets at the sending node and sequentially transmitting the packets in a sequence from the sending node over a plurality of data transmission paths. This is followed by the receiving of the sequence of data packets at the receiving node and passing the received data packets directly to a receiving application if the received data packets have sequential packet numbers. The method reconstructs the data packets into the transmitted sequence if the received data packets do not have sequential packet numbers.

The method for reconstructing the data packets into the transmitted sequence includes the steps of storing a first out-of-sequence data packet in a reconstruction buffer, and starting a packet timer, T1, at the receiving node when the out-of-sequence packet is received. T1 times the longest permissible transfer time of a single packet through the network. Subsequently received data packets are also stored in the buffer. If a received packet forms a sequence at the beginning of the buffer, the sequence is passed to the receiving application. If there are any other out-of-sequence packets left in the buffer, T1 is restarted with a T1 value equal to the T1 default value minus the total time spent by the next out-of-sequence packet in the reconstruction buffer. If there are no more out-of-sequence packets in the reconstruction buffer, then T1 is stopped. If T1 expires, or the buffer fills up, the first sequence of packets in the buffer are passed to the receiving application, regardless of their position in the buffer. Once again, if there are any other out-of-sequence packets left in the buffer, T1 is restarted with a T1 value equal to the T1 default value minus the total time spent by the next out-of-sequence packet in the reconstruction buffer. If there are no more out-of-sequence packets in the reconstruction buffer, then T1 is stopped.

In another aspect, the present invention is a method of preserving data packet sequencing when a plurality of data packets are transmitted over a plurality of data transmission paths between a sending node and a receiving node in a radio telecommunications network. The method begins by the sending node labeling each packet being transmitted with an increasing sequence number until a predetermined number of packets have formed a sequence, and then repeating the sequence numbers for each subsequent sequence. The packets are then transmitted from the sending node in a series of sequences, each sequence containing the predetermined number of data packets and repeating the sequential numbers assigned to each data packet within each sequence. The sequence numbers are simply dictated by the packet number wrapping due to limited storage space for the sequence numbers. When a first data packet is received out of sequence at the receiving node, it is time-stamped and placed in a reconstruction buffer, and a packet timer, T1, is started. T1 times the longest permissible transfer time of a single packet through the network. Subsequently received data packets are also stored in the buffer. If a received packet forms a sequence at the beginning of the buffer, the sequence is passed to the receiving application. If there are any other out-of-sequence packets left in the buffer, T1 is restarted with a T1 value equal to the T1 default value minus the total time spent by the next out-of-sequence packet in the reconstruction buffer. If there are no more out-of-sequence packets in the reconstruction buffer, then T1 is stopped. The buffer contains storage space to store the maximum number of data packets that may be received by the network interface during T1. If a sequence is formed at the beginning of the buffer space before T1 expires, the sequence is passed to the receiving application. If T1 expires, or the buffer fills up, any sequential packets in the buffer are passed to the receiving application. An inactivity timer, T2, is started whenever the buffer is empty. T2 times the time period for the sequence number to repeat itself (wrap-around). If T2 expires before a packet is received, the process starts over.

In another aspect, the present invention is a method of transmitting data from a first node in a radio telecommunications network to a second node in the radio telecommunications network. The method includes the steps of packetizing the data in a plurality of data packets having an original sequence of sequential packet numbers, and transmitting the data packets from the first node over a plurality of data transmission paths to the second node using the User Datagram Protocol/Internet Protocol (UDP/IP) data transmission protocol. The UDP/IP protocol is adapted with a resequencing algorithm, and the method concludes by resequencing the plurality of data packets at the second node into the original sequence.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
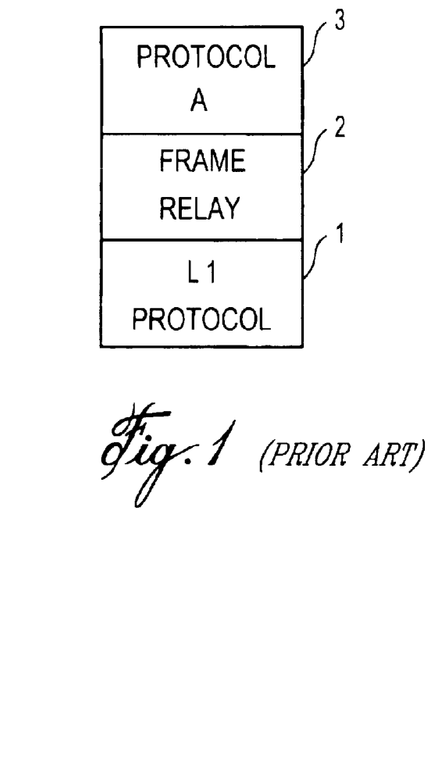
FIG. 1 (Prior Art) is an illustrative diagram of an existing frame relay (FR) protocol stack utilized in a radio telecommunications network.

FIG. 1 is an illustrative diagram of an existing frame relay (FR) protocol stack utilized in a radio telecommunications network. A physical layer (L1) protocol 1 is shown supporting the FR layer 2. An application protocol (Protocol A) 3 is supported by the FR layer.

Figure 2:
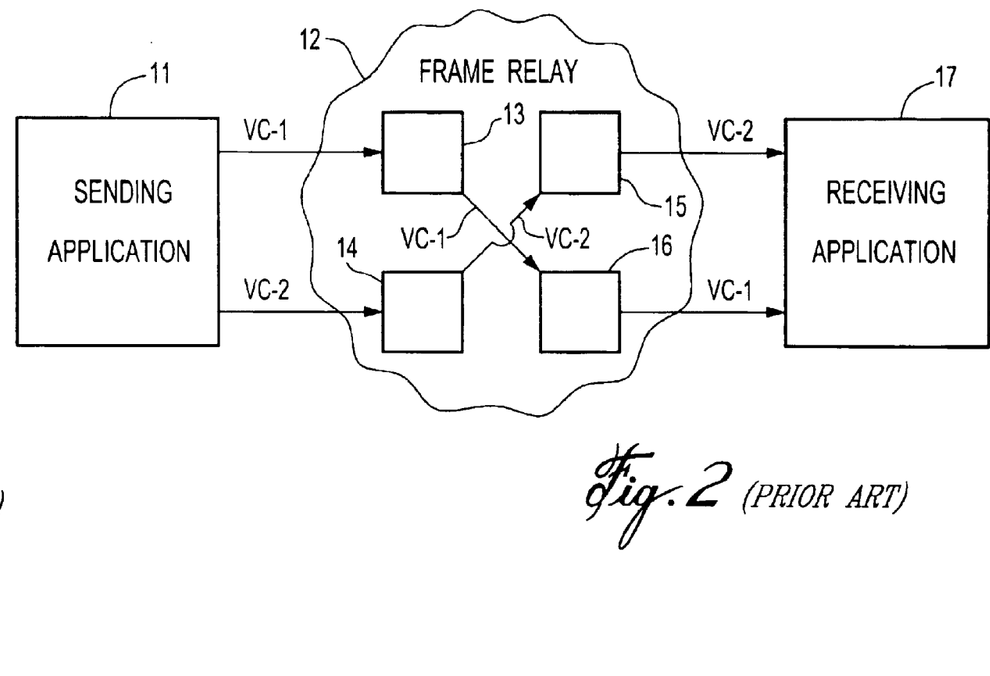
FIG. 2 (Prior Art) is a simplified block diagram illustrating two components of a radio telecommunications network communicating data with the FR protocol of FIG. 1.

FIG. 2. is a block diagram illustrating components of a frame relay network showing the transmission of data packets between two application programs utilizing the FR protocol of FIG. 1. In FIG. 2, a frame relay (FR) network 12 is depicted as a plurality of virtual circuits (VC-1 and VC-2) with a plurality of network nodes and network paths between a sending application and a receiving application. All of the data packets sent by the sending application across the FR network follow the same VC path through the network.

A sending application which resides on node 11 transmits data packets across a frame relay network 12 to a receiving application residing on node 17. The network may be, for example, a General Packet Radio Service (GPRS) network with the sending application 11 residing on a Serving GPRS Service Node (SGSN), and the receiving application residing on a Base Station System (BSS). Once the first data packet selects a route across the FR 12, all subsequent data packets follow the same path and are received in the same order by the receiving application 17.

The FR 12 is comprised of virtual circuit nodes 13–16. Although the network in FIG. 2 is illustratively shown to only include four nodes, it should be clearly understood that in practice, the number of nodes would be much larger.

The first data packet is transmitted by means of a particular route across the VC nodes and all subsequent data packets follow the same path. For example, sending application 11 may transmit an entire data stream broken up into a plurality of data packets which may follow VC-1 by means of node 13 and node 16 arriving at the receiving application 17. Another stream of data may be sent across VC-2 by means of nodes 14 and 15 and arriving at the receiving application. Packets sent across VC-1 or VC-2 may get congested or lost and never arrive at the receiving application.

Figure 3:
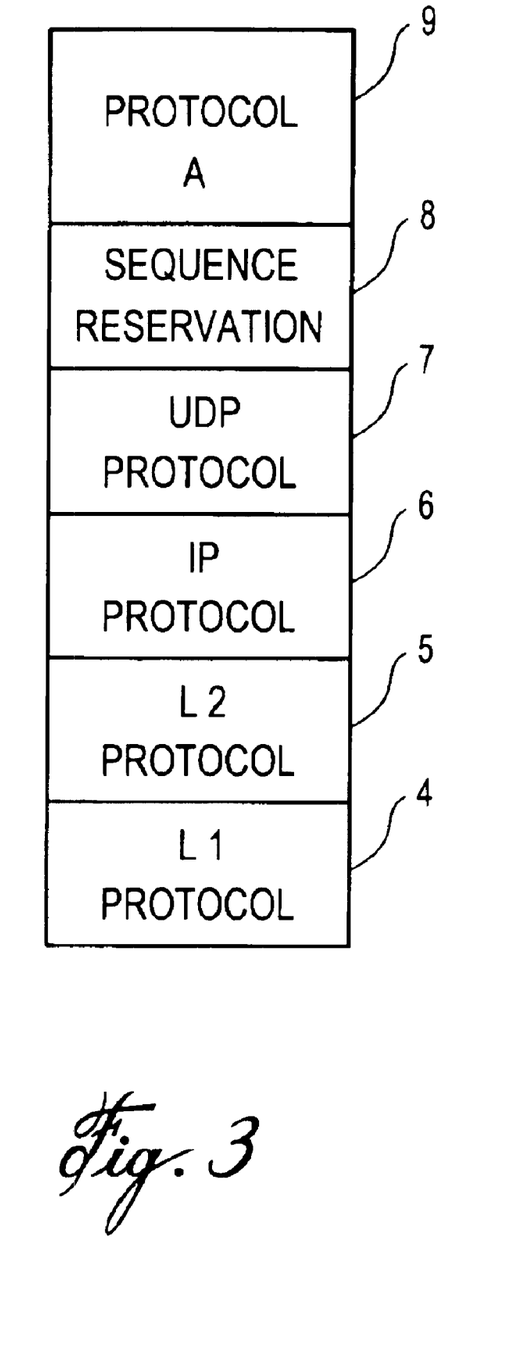
FIG. 3 is an illustrative diagram of a UDP/IP protocol stack augmented with a sequence preservation layer in accordance with the teachings of the present invention.

FIG. 3 is an illustrative diagram of a UDP/IP protocol stack augmented with a sequence preservation layer in accordance with the teachings of the present invention. A physical layer (L1) protocol 4 providing transmission of signals and the activation and deactivation of physical connections is shown supporting a layer 2 (L2) protocol 5. Layer 2 is a data link layer that may include signal synchronization, error correction, sequencing, and flow control. This layer also provides a data transmission link across one or several physical connections. When an IP protocol layer 6 is used, transmitted packets may use several L2 layers (without any coordination) when the packets cross several networks built on top of several different L2 protocols. The UDP protocol 7 is shown over the IP layer. The present invention implements the Sequence Preservation layer 8 over the UDP layer. Finally, an application layer (Protocol A) 9 is shown over the Sequence Preservation layer. It should be noted that the method of the present invention is completely independent from any application. This is important because application-oriented schemes such as Real-Time Transmission Protocol (RTTP) running over UDP cannot be used because they are too tightly coupled to the applications they support.

Figure 4:
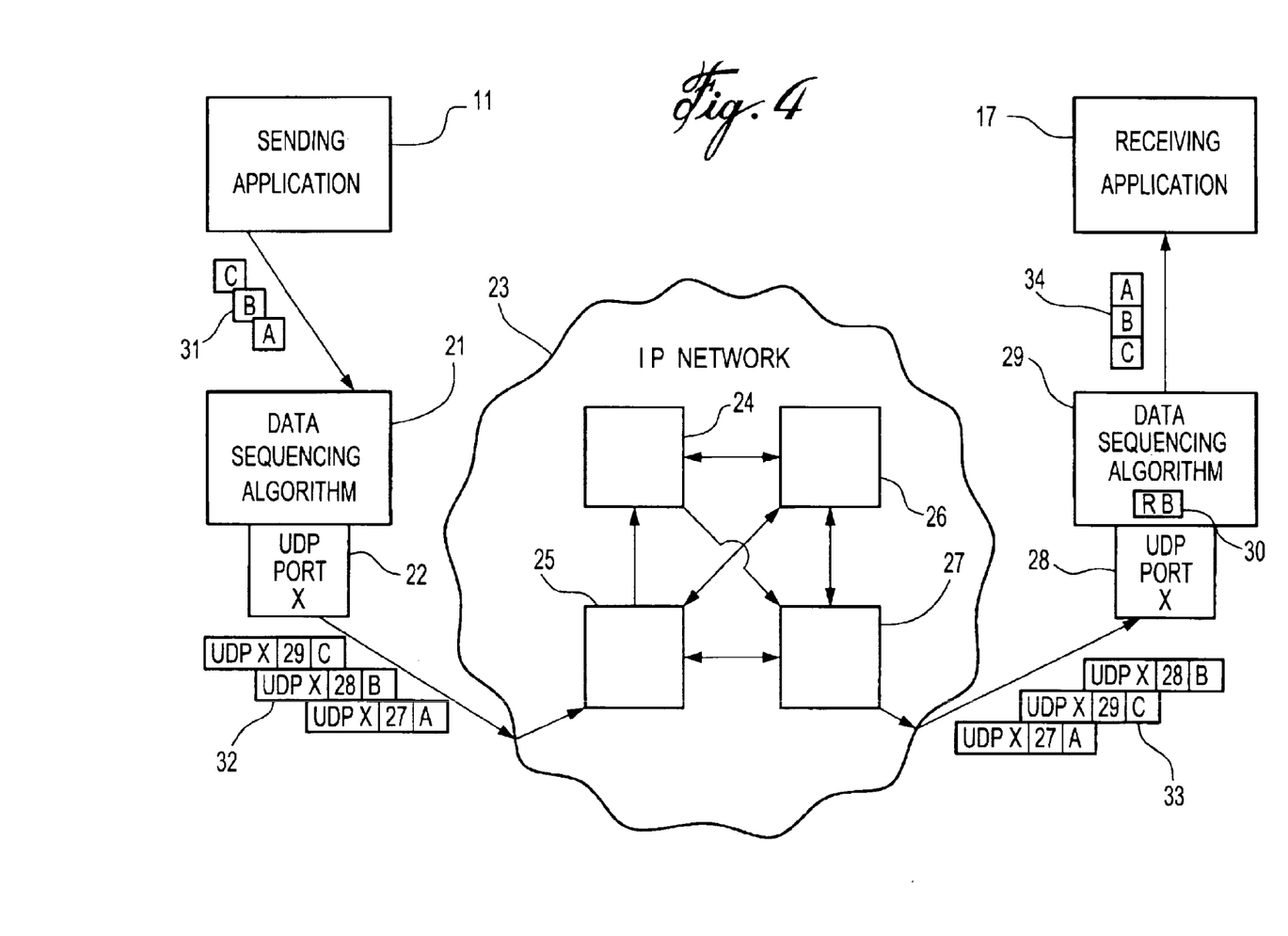
FIG. 4 is a simplified block diagram illustrating two components of a radio telecommunications network communicating data with the augmented UDP/IP protocol over a connectionless data network in accordance with the teachings of the present invention.

FIG. 4 is an illustrative drawing of a sending application 11 transmitting data packets across a connectionless P network to a receiving application 17 utilizing the augmented UDP protocol of the present invention. The network may be, for example, a GPRS network with the sending application 11 residing on an SGSN, and the receiving application residing on a BSS, although the invention is not limited to the SGSN-BSS application.

The network comprises a sending application 11, a data sequencing algorithm 21, a transmitting UDP port 22, the IP network 23 consisting of a plurality of nodes 24–27, and a receiving application 17 with a second data sequencing algorithm 29 and UDP port 28. Although the network in FIG. 4 is illustratively shown to only include a single sending application and receiving application, it should be clearly understood that in practice, the number of sending and receiving applications would be much larger.

In an IP network, there is no predefined route. Each packet is sent on a "best efforts" basis, and each packet can take a different route. Therefore, there is no guarantee that the packets will arrive at the destination node in the same order that they were transmitted from the origination node. Therefore, to replace the frame relay interface with an IP-based interface, it is necessary to account for the requirement to order the packets at the destination node. The nodes are upgraded with an algorithm to resequence the packets.

The present invention performs two functions to achieve this: adding sequencing information to the packets, and augmenting the UDP protocol with a data sequencing algorithm that uses the information added to the packets to resequence the packets at the receiving end.

According to the invention, the data sequencing algorithm adds header information to each data packet prior to transmitting the data packets across the IP network. The data packets are then transmitted across the IP network by a plurality of nodes and routes. Prior to reaching the receiving application, these packets are transmitted through another UDP port and a data sequencing algorithm. The data sequencing algorithm sequences the data packets in the proper order as initially sent by the sending application.

Specifically, the sending application which resides on node 11 transmits data packets through the data sequencing algorithm 21 by means of the UDP port 22. The data sequencing algorithm adds header information to data packets 31 with sequence identification numbers resulting in data packets with header information 32. Once header information is added, the data packets are sent across the connectionless IP network 23.

The data packets 32 may be sent across the IP network by a multitude of paths and nodes. Unlike the prior art where data packets must follow the same VC path as the first data packet, data packets in the UDP/IP environment may take any route. For example, data packet 32A may flow from the UDP port 22 through nodes 24 and 26 to UDP port 28. Data packet 32B may travel across nodes 25 and 26 and data packet 32C may travel across nodes 25 and 27 and may arrive at UDP port 28 prior to data packets 32A and 32B.

After being transmitted through UDP port 28, the data packets 33 are processed by a second data sequencing algorithm 29. This algorithm uses a Reconstruction Buffer (RB) 30 to resequence the data packets in the proper order, and then deletes the header information added by data sequencing algorithm 21. The RB contains a sorted list of currently received packets in increasing order. At its beginning, the buffer contains the first (according to the sequence number) available packet waiting for a set of one or more missing packets. Once sequenced, the data packets are sent to the receiving application 17.

Figure 5:
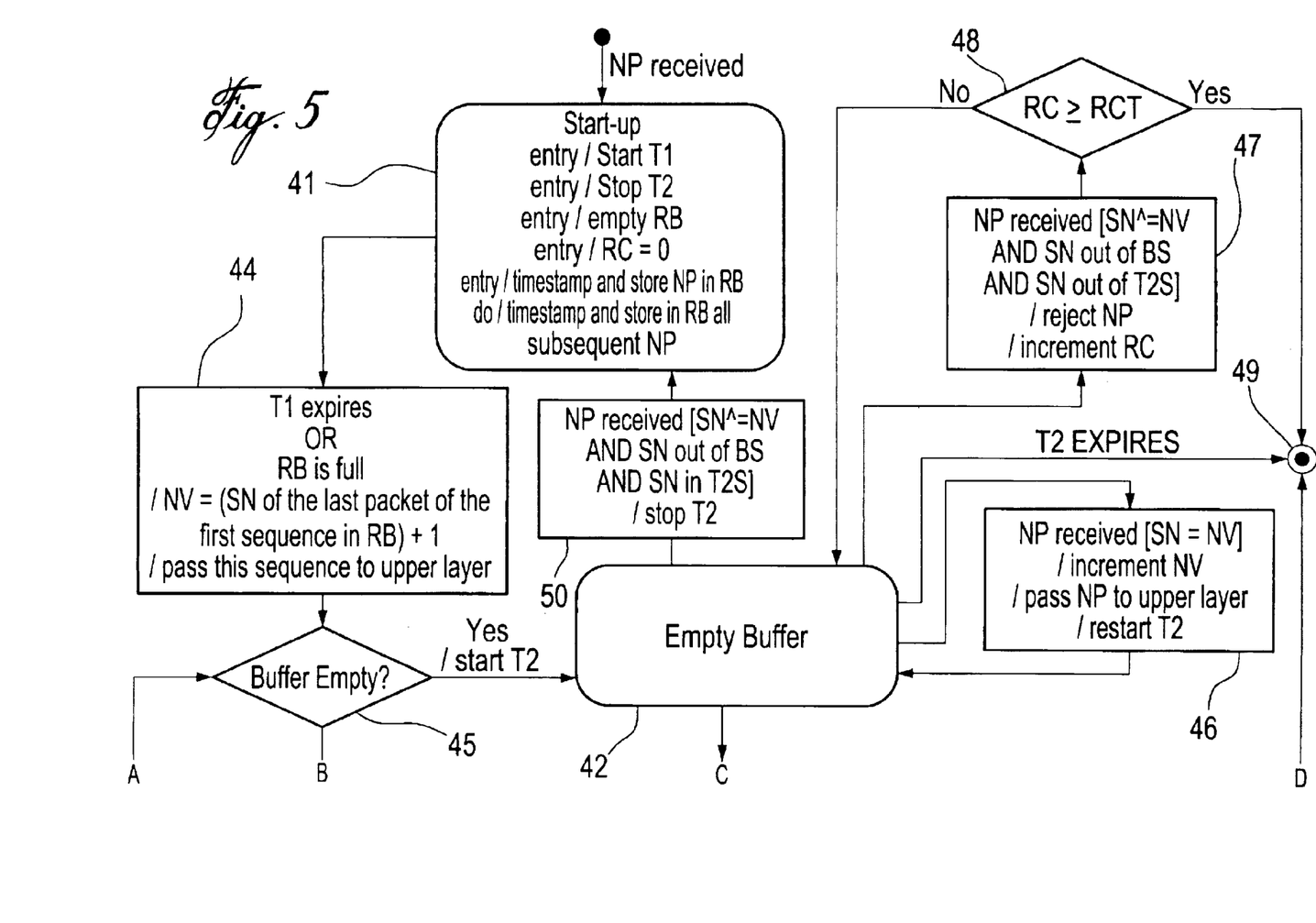
FIG. 5 is a flow chart illustrating the steps of the preferred embodiment of the method of the present invention.

FIG. 5 is a flow chart illustrating the steps of the preferred embodiment of the method of the present invention when preserving data packet sequencing between a plurality of computer application programs on a connectionless, IP-based network. Specifically, data sequencing algorithms 21 and 29 from FIG. 4 are described.

The method of the present invention utilizes the data sequencing algorithm on the sending application, a packet timer T1 and an inactivity timer T2 in the receiving node, a data reconstruction buffer in the receiving node, and a data sequencing algorithm on a receiving application. Each algorithm is based upon the following elements:

1. Sequence Number (SN): Each data packet transferred across the IP network contains a sequence number; each sequence number corresponds to one application per UDP port and is increased by the sending host for each data packet.
2. Sequence Number Universe (SNU): The highest possible value of the sequence number.
3. Packet Timer (T1): A timer that functions as a wait-for-data-packet-timer and corresponds to the longest permissible transfer time of a single packet through the network.
4. Inactivity Timer (T2): A timer that corresponds to the time period for the Sequence Number to wrap around. For example, if there are sequence numbers from 0 to 7, it is the time to send 8 packets over the network, i.e. 0 to 0.
5. Single Packet Transfer Time (SPTT): Corresponds to the time taken to transfer one packet.
6. Sequence Reconstruction Buffer (RB): Data packet buffer used to reconstruct the packet sequence.
7. Reconstruction Buffer Size (RBS): Corresponds to the size of the sequence reconstruction buffer.
8. Next Packet (NP): Next packet present at any stage of the sending or receiving algorithm.
9. Next Value (NV): Expected Sequence Number value.
10. Clock: A real-time, high-resolution clock.
11. Rejection Counter (RC): This value is incremented every time an NP is rejected.
12. Rejection Counter Threshold (RCT): Start-up of the algorithm is commenced once the RC reaches this threshold value.
13. Buffer Space (BS): Corresponds to all possible SN values that can be a part of the RB. SN is in BS when $((SN>NV)$ and $(SN<\alpha)$ and $(NV<\alpha))$ or $(((SN<\alpha)$ or $(SN>NV))$ and $(NV>\alpha))$, where $\alpha=(NV+RBS)$ modulus SNU.
14. T2 Space (T2S): Corresponds to all possible SN values that may be received during the currently elapsed T2 timer. SN is in T2S when: $((SN>NV)$ and $(SN<\beta)$ and $(NV<\beta))$ or $(((SN<\beta)$ or $(SN>NV))$ and $(NV>\beta))$; where $\beta=((T2-T2\ remaining) * (1/SPTT)+ NV)$ modulus SNU.

The following description begins when an application begins a data transmission. The sending application includes a counter that places the packet sequence number in the header of a first packet which it then sends over a UDP/IP network.

The method of the present invention operates from three basic states: a Start-up state 41, an Empty Buffer state 42, and a Buffer Not Empty state 43. In the Start-up state, the receiving node receives the first packet and starts packet timer T1. The receiving node does not know where the received packet falls in the sequence numbering, so it puts the packet in the reconstruction buffer (RB) 30. Packet timer T1 limits the time that the packets stays in the RB before being passed to the receiving application. This time period corresponds to the longest permissible transfer time to pass a single packet through the network.

In the Start-up state, the resequencing algorithm does not know which value is the beginning of the buffer, so it must wait until T1 expires or the buffer is full. When one of these circumstances happens, the first sequence in the buffer is assumed to be at the beginning of the buffer, and is passed to the application. Note that at that point, the entire buffer may be a single sequence (every packet is sequential), or there may be several sequences in the buffer separated by several gaps. This determines whether the algorithm then goes to the Empty Buffer state 42 or the Buffer Not Empty state 43 because only the first contiguous sequence is sent to the application.

Thus, when additional packets are received, they are placed in the buffer by increasing packet numbers from the beginning of the buffer. When the RB is full or T1 expires, the first sequence in the RB (i.e., the sequence nearest the beginning of the buffer) is passed to the upper layer. If any other packets are left inside the RB, T1 is restarted with the value T1=T1 default value−(current time−timestamp of first NP in RB), as shown in block 52. Otherwise, T1 is stopped, the method enters the Empty Buffer state, and T2 is started.

Inactivity timer T2 measures a time period corresponding to the amount of time it takes the sequence number to repeat itself (i.e., wrap around): if there are sequence numbers from 0 to 7, T2 is the time required to send 8 packets over the network, i.e. 0 to 0. The timers ensure that the packets are passed from the RB before any ambiguities on whether a packet belongs to a prior sequence or later sequence. T2 is started when the RB is empty. If T2 expires before any packets are received, the method returns to the Start-up state.

In the Start-up state 41, the following process is performed when the received packets are received in sequence. Every packet received is time-stamped and stored in the buffer. When the buffer is full or T1 expires, the sequence is passed to the upper layers. The next value is incremented to the value after the last packet received in the sequence. Thus, no packets are passed to the upper layer until either T1 expires or the RB is full.

When the first packet is received, the process must first determine if the packet is in sequence. Therefore, it is placed in the RB until either the RB is full, or T1 expires. At 44, if T1 expires before the buffer is full, or the buffer fills up, all buffered packets are passed to the upper layer, and the expected sequence number value (NV) of the next packet is incremented. Any packet that arrives after the expiration of T1, and has a sequence number within the range of the packets passed from the buffer to the receiving application, is considered lost.

At 45, it is determined whether or not the buffer is empty. If so, T2 is started and the method moves to the Empty Buffer state 42. Timer T2 enables the process to determine that a received packet is in the current sequence and not in the following sequence. In the Empty Buffer state, the only packet that can be received and passed to the receiving application is the packet having a sequence number that matches the expected sequence number value (NV). Therefore, if the next packet to arrive has a sequence number that matches NV, the process moves to step 46 and increments the value of the next packet to be received, passes the packet to the receiving application, and restarts T2. At 42, if the next packet to arrive has a sequence number that is not equal to NV, and its sequence number is out of the range of the buffer space and out of the range of T2 space, the process moves to step 47, where the next packet is rejected, and a rejection counter (RC) is incremented.

At step 48, it is determined whether or not the rejection counter equals or exceeds a rejection counter threshold (RCT). If not, the process remains in the Empty Buffer state 42. If so, the process moves to step 49 and starts over at the Start-up state. Additionally, in the Empty Buffer state, if T2 expires before any packet is received, the process moves to 49 and starts over.

From the Empty Buffer state 42, if a packet is received at step 50, and the packet is not the one expected, and the sequence number is out of the range of the buffer, but is within the T2 space, then the process starts over at step 41.

From the Empty Buffer state 42, if a packet is received at 51, and it is not the one expected, but the sequence number is in the range of the buffer, then the packet is time stamped and buffered, T2 is stopped, and T1 is started with a default value. The process then enters the Buffer Not Empty state 43.

Alternatively, if it is determined at step 45 that the buffer is not empty, the process moves to step 52 where the timer T1 is set to a value equal to the T1 default value minus the quantity (current time minus the timestamp of the first available packet in the buffer) and started. The process does not wait any longer than T1 for any packet in the buffer. Since some packets were buffered, the value T1 is something less than the default value because the process has already waited some amount of time. The process then goes into the Buffer Not Empty state 43.

In the Buffer Not Empty state 43, if T1 expires, or the buffer fills up, or a next packet is received with the expected sequence number, the process moves to step 53 where T1 is stopped, the expected sequence number value is incremented from the sequence number of the last packet in the first sequence in the buffer, and the sequence in the buffer is passed to the receiving application. The process then returns to step 45.

In the Buffer Not Empty state 43, if the next packet received does not have the expected sequence number, the process moves to step 54 where the packet is time stamped and placed in the buffer. If the next packet received does not have the expected sequence number and its sequence number is out of the range of the buffer space, the process moves to step 55 where the packet is rejected and the rejection counter is incremented. At step 56, it is determined whether or not the rejection counter equals or exceeds the rejection counter threshold. If not, the process remains in the Buffer Not Empty state 43. If so, the process moves to step 49 and starts over.

In this manner, data packets transmitted over a plurality of data transmission paths between a sending node and a receiving node in an IP-based network are resequenced at the receiving node in the same order as they were sent by the sending node. Thus, in the Buffer Not Empty state, if a received packet forms a sequence at the beginning of the buffer, the sequence is passed to the receiving application, and T1 is reset. If T1 expires, or the buffer fills up, any sequential packets in the buffer are passed to the receiving application, regardless of their position in the buffer.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claim.

What is claimed is:

1. A method of preserving data packet sequencing when a plurality of data packets are transmitted over a plurality of data transmission paths between a sending node and a receiving node in a radio telecommunications network, said method comprising the steps of:

sequentially numbering the data packets at the sending node;

sequentially transmitting the packets in a sequence from the sending node over the plurality of data transmissions paths;

receiving the sequence of data packets at the receiving node;

passing the received data packets directly to a receiving application if the received data packets have sequential packet numbers; and reconstructing the data packets into the transmitted sequence if the received data packets do not have sequential packet numbers, said reconstructing step including the steps of:

storing a first data packet received out of sequence in a reconstruction buffer having a finite storage space with a beginning and an end;

storing additional received data packets in the buffer in increasing numerical order from the beginning of the buffer;

determining whether two or more stored data packets at the beginning of the buffer have sequential packet numbers;

sending the two or more stored data packets with sequential packet numbers from the buffer to the receiving application;

starting a packet timer, T1, at the receiving node when the first out-of-sequence data packet is received, T1 timing the longest permissible transfer time of a single packet through the network, and T1 being reset each time a sequential data packet at the beginning of the buffer is received, or the buffer is filled;

determining whether or not T1 expires before a sequential data packet at the beginning of the buffer is received or the buffer is filled; and passing any sequential data packets stored in the buffer to the receiving application if T1 expires before a sequential data packet at the beginning of the buffer is received, or if the buffer is filled.

2. A method of preserving data packet sequencing when a plurality of data packets are transmitted over a plurality of data transmission paths between a sending node and a receiving node in a radio telecommunications network, said method comprising the steps of:

labeling by the sending node, each packet being transmitted with an increasing sequence number;

transmitting the packets from the sending node over the plurality of data transmissions paths to the receiving node;

receiving a first data packet out of sequence at the receiving node;

starting a packet timer, T1, at the receiving node when the first out-of-sequence data packet is received, T1 timing the longest permissible transfer time of a single packet through the network, and T1 being reset each time a sequential data packet is received;

time-stamping the first out-of-sequence data packet and storing it in a reconstruction buffer, said buffer containing storage space to store the maximum number of data packets that can be received before T1 expires;

storing subsequently received packets in the buffer in increasing numerical order from the beginning of the buffer;

receiving a second data packet;

determining whether or not the second packet is assigned a number that is sequential to the number of the first data packet;

passing the first and second data packets from the buffer to the receiving application if the second packet is assigned a number that is sequential to the number of the first data packet, and the first and second data packets are at the beginning of the buffer;

retaining the second data packet in the buffer if the second packet is assigned a number that is not sequential to the number of the first data packet, or if the first and second packets are sequential but not at the beginning of the buffer;

determining whether or not the buffer is full;

continuing to store received packets if the buffer is not full;

if the buffer is full, determining if there are any sequences of packets that are not at the beginning of the buffer, and passing the sequence of packets that have the lowest sequential numbers to the receiving application;

determining whether or not T1 expires before a sequential data packet at the beginning of the buffer is received;

passing any sequential data packets from the buffer to a receiving application if T1 expires before a sequential data packet at the beginning of the buffer is received;

starting an inactivity timer, T2, whenever the buffer is empty, T2 timing a time period for the sequence number to repeat itself (wrap around);

determining whether or not T2 expires before another packet is received; and starting the method over if T2 expires.

3. A method of preserving data packet sequencing when a plurality of data packets are transmitted over a plurality of data transmission paths between a sending node and a receiving node in a radio telecommunications network, said method comprising the steps of:

labeling by the sending node, each packet being transmitted with an increasing sequence number until a predetermined number of packets have formed a sequence;

repeating the sequence numbers in subsequent sequences of packets;

transmitting the packets from the sending node in a series of sequences, each sequence containing the predetermined number of data packets and repeating the sequential numbers assigned to each data packet within each sequence;

receiving the transmitted packets in the receiving node;

determining whether or not the received packets have sequential packet numbers;

passing the received data packets directly to a receiving application if the received data packets have sequential packet numbers; and reconstructing the data packets into the transmitted sequence if the received data packets do not have sequential packet numbers by:

storing the received data packets in a reconstruction buffer having a storage space with a beginning and an end, said received packets being stored in the buffer in increasing numerical order from the beginning of the buffer;

determining whether two or more packets have sequential numbers and are stored at the beginning of the buffer;

passing the two or more packets to the receiving application if they have sequential numbers and are stored at the beginning of the buffer;

retaining the two or more packets in the buffer if they have sequential numbers and are not stored at the beginning of the buffer;

determining whether subsequently received packets fill a gap between the beginning of the buffer and the two or more sequential packets; and passing the two or more sequential packets and the subsequently received packets to the receiving application if the subsequently received packets fill the gap between the beginning of the buffer and the two or more packets.

4. A method of preserving data packet sequencing when a plurality of data packets are transmitted over a plurality of data transmission paths between a sending node and a receiving node in a radio telecommunications network, said method comprising the steps of:

labeling by the sending node, each packet being transmitted with an increasing sequence number;

transmitting the packets from the sending node over the plurality of data transmissions paths to the receiving node;

receiving the data packets at the receiving node;

determining whether the received data packets have sequential packet numbers;

passing the received data packets directly to a receiving application if the received data packets have sequential packet numbers;

storing the received data packets in a reconstruction buffer if the received data packets do not have sequential packet numbers;

starting a packet timer, T1, at the receiving node when the first out-of-sequence data packet is received, T1 timing the longest permissible transfer time of a single packet through the network, and T1 being reset each time a sequential data packet at the beginning of the buffer is received, or the buffer is filled;

determining whether or not T1 expires before a sequential data packet at the beginning of the buffer is received or the buffer is filled; and passing any sequential data packets stored in the buffer to the receiving application if T1 expires before a sequential data packet at the beginning of the buffer is received, or if the buffer is filled.

5. In a data network in which a plurality of data packets are transmitted over a plurality of data transmission paths between a sending node and a receiving node, the data packets being numbered with increasing sequence numbers, a method of resequencing the data packets in a reconstruction buffer in the receiving node prior to passing the data packets to a receiving application, said method comprising the steps of:

(A) entering a Start-up state when a transmission begins, said startup state performing the steps of:
  (1) starting a packet timer, T1, when a first data packet is received, T1 timing the longest permissible transfer time of a single packet through the network;
  (2) placing additional packets in the buffer in increasing sequence number;
  (3) determining whether T1 expires or the buffer is full;
  (4) passing a first group of sequential data packets at the beginning of the buffer to the receiving application;
  (5) determining whether the buffer is empty;
  (6) proceeding to step (B) upon determining that the buffer is empty; and
  (7) proceeding to step (C) upon determining that the buffer is not empty;

(B) entering an Empty Buffer state, said Empty Buffer state performing the steps of:
  (1) starting an inactivity timer, T2, that measures a time period for the sequence number to repeat itself (wrap around);
  (2) if T2 expires before receiving a packet, returning to the Start-up state;
  (3) if a subsequent data packet is received having a sequence number that equals the expected value of the sequence number for the next data packet to be received:
    (a) passing the subsequent data packet having a sequence number that equals the expected value to the receiving application;
    (b) incrementing the expected value; and
    (c) restarting T2;
  (4) if a subsequent data packet is received having a sequence number that does not equal the expected value and is out of the range of the buffer space, the sequence number is in the T2 space, and T2 has not expired:
    (a) stopping T2; and
    (b) returning to the Start-up state;
  (5) if a subsequent data packet is received having a sequence number that does not equal the expected value and is out of the range of the buffer space, and out of T2 space:
    (a) rejecting the subsequent data packet;
    (b) incrementing a rejection counter; and
    (c) determining whether the rejection counter equals a rejection counter threshold;
    (d) remaining in the Empty Buffer state if the rejection counter does not equal the rejection counter threshold; and
    (e) returning to step (A) if the rejection counter equals the rejection counter threshold; and
  (6) proceeding to step (C) upon determining that a subsequent data packet is received having a sequence number that does not equal the expected value and is within the range of the buffer; and (C) entering a Buffer Not Empty state, said Buffer Not Empty state performing the steps of:
  (1) if a subsequent data packet is received having a sequence number that does not equal the expected value:
    (a) time stamping the subsequent packet; and
    (b) storing the subsequent packet in the buffer;
  (2) if T1 has expired, the buffer is full, or if a subsequent data packet is received having a sequence number that equals the expected value:
    (a) passing sequential data packets at the beginning of the buffer to the receiving application;
    (b) incrementing the expected value; and
    (c) returning to the Empty Buffer state if the buffer is empty;
  (3) if a subsequent data packet is received having a sequence number that does not equal the expected value and the sequence number is out of the range of the buffer:
    (a) rejecting the subsequent data packet;
    (b) incrementing a rejection counter; and
    (c) determining whether the rejection counter equals a rejection counter threshold;
    (d) remaining in the Buffer Not Empty state if the rejection counter does not equal the rejection counter threshold; and
    (e) returning to the Start-up state if the rejection counter equals the rejection counter threshold.

* * * * *